United States Patent
Cavarec et al.

(10) Patent No.: US 11,021,034 B2
(45) Date of Patent: Jun. 1, 2021

(54) ANTI-ROLL DEVICE WITH CONTROLLED COUPLING MEANS FOR A MOTOR VEHICLE AXLE ASSEMBLY

(71) Applicants: PSA AUTOMOBILES SA, Poissy (FR); BWI FRANCE S.A.S.U., Roissy-en-France (FR)

(72) Inventors: Alan Cavarec, Les Loges en Josas (FR); Philippe Germain, Fontenay-sous-Bois (FR); Bruno Perrée, Paris (FR)

(73) Assignees: PSA AUTOMOBILES SA, Poissy (FR); BWI FRANCE S.A.S.U., Roissy-En-France (FR)

( * ) Notice: Subject to any disclaimer, the term of this patent is extended or adjusted under 35 U.S.C. 154(b) by 17 days.

(21) Appl. No.: 16/622,455

(22) PCT Filed: May 23, 2018

(86) PCT No.: PCT/FR2018/051224
§ 371 (c)(1),
(2) Date: Dec. 13, 2019

(87) PCT Pub. No.: WO2018/229376
PCT Pub. Date: Dec. 20, 2018

(65) Prior Publication Data
US 2020/0156432 A1 May 21, 2020

(30) Foreign Application Priority Data
Jun. 14, 2017 (FR) ...................................... 1755356

(51) Int. Cl.
*B60G 21/055* (2006.01)
(52) U.S. Cl.
CPC ..... *B60G 21/0555* (2013.01); *B60G 21/0558* (2013.01); *B60G 21/0556* (2013.01);
(Continued)

(58) Field of Classification Search
CPC ............ B60G 21/0553; B60G 21/0555; B60G 21/0556; B60G 21/0558; B60G 2202/135;
(Continued)

(56) References Cited

U.S. PATENT DOCUMENTS 5,788,031 A   8/1998 Saito
6,003,880 A * 12/1999 Kokotovic ......... B60G 17/0162
                                               280/5.506

(Continued)

FOREIGN PATENT DOCUMENTS

DE   102007062146 A1 *  6/2009 ......... B60G 21/0555
DE   102017114324 A1 *  1/2019 ......... B60G 21/0555
(Continued)

OTHER PUBLICATIONS

International Search Report for PCT/FR2018/051224 dated Aug. 23, 2018.
Written Opinion for PCT/FR2018/051224 dated Aug. 23, 2018.

*Primary Examiner* — Paul N Dickson
*Assistant Examiner* — Daniel M. Keck
(74) *Attorney, Agent, or Firm* — Sandberg Phoenix & von Gontard, P.C.

(57) ABSTRACT

An anti-roll device equips an axle assembly of a motor vehicle and comprises two connecting rods of which one comprises a part of coupling means comprising: a housing subdivided into two parts by a piston and comprising two inlets-outlets communicating with the two parts and an intermediate inlet-outlet communicating with at least one of the parts depending on the position of the piston, a fluid reservoir supplying a conduit coupled to the intermediate inlet-outlet, two non-return means coupled to the inlets-outlets and to the conduit, and an electrically operated valve coupled to the inlets-outlets and placed either in an open state ensuring a connection between the parts and the fluid (Continued)

FIG.2 reservoir via the intermediate inlet-outlet, or in a closed state allowing fluid discharge out of the housing only through the intermediate inlet-outlet.

8 Claims, 2 Drawing Sheets

(52) U.S. Cl.
CPC .. *B60G 2202/135* (2013.01); *B60G 2202/413* (2013.01); *B60G 2202/414* (2013.01); *B60G 2204/1224* (2013.01)

(58) Field of Classification Search
CPC ........ B60G 2202/414; B60G 2202/416; B60G 2204/1224
See application file for complete search history.

(56) References Cited

U.S. PATENT DOCUMENTS

| | | | |
|---|---|---|---|
| 6,179,310 B1 * | 1/2001 | Clare | B60G 17/0152 280/124.106 |
| 8,167,319 B2 | 5/2012 | Ogawa | |
| 9,174,508 B2 * | 11/2015 | Anderson | F16F 9/466 |
| 9,751,374 B2 * | 9/2017 | Izak | B60G 17/0152 |
| 10,890,197 B2 * | 1/2021 | Belter | B60G 17/0416 |
| 2007/0013151 A1 * | 1/2007 | Grethel | B60G 21/0555 280/5.508 |
| 2007/0075515 A1 * | 4/2007 | Smay | B60G 21/0555 280/124.107 |
| 2008/0067863 A1 * | 3/2008 | Germain | B60G 17/0162 303/11 |
| 2008/0309032 A1 * | 12/2008 | Keane | B60G 21/0555 280/5.509 |
| 2018/0134111 A1 * | 5/2018 | Toyohira | B60G 15/065 |

FOREIGN PATENT DOCUMENTS

| | | | | |
|---|---|---|---|---|
| EP | 0865944 A1 * | 9/1998 | ......... | B60G 21/0555 |
| FR | 2670716 A | 6/1992 | | |
| FR | 2786133 A1 | 5/2000 | | |
| FR | 2918719 A1 * | 1/2009 | ............. | F15B 21/08 |
| JP | S6340214 U | 3/1988 | | |
| JP | H0263914 A | 3/1990 | | |
| KR | 20200124560 A * | 11/2020 | | |

* cited by examiner

ANTI-ROLL DEVICE WITH CONTROLLED COUPLING MEANS FOR A MOTOR VEHICLE AXLE ASSEMBLY

CROSS-REFERENCE TO RELATED APPLICATIONS

This application is the US National Stage under 35 USC § 371 of International Application No. PCT/FR2018/051224, filed 23 May 2018 which claims priority to French Application No. 1755356 filed 14 Jun. 2017, both of which are incorporated herein by reference.

BACKGROUND

The invention relates to anti-roll (or anti-sway or stabilizer) devices that equip certain motor vehicles.

An anti-roll (or anti-sway or stabilizer) device comprises a bar, the opposite ends of which are coupled to the right and left wheels respectively of a vehicle (automobile) axle assembly via two connecting rods. The bar is subjected to stresses mainly when the vehicle travels round a bend or on a road that is asymmetrically degraded in relation to its longitudinal axis. In the case of a bend, the bar is subjected to torsional and flexional stresses in order to maintain the attitude of the vehicle for as long as possible, and so the stiffer the bar is, the more useful it is. In the event of a degradation, the bar partially transmits the road irregularity undergone by one of the wheels of an axle assembly to the other wheel of this same axle assembly by a phenomenon known as "roll feedback", and so the stiffer the bar is, the more it causes a degradation of comfort.

In order to vary the degradation of comfort caused by the anti-roll device on the basis of the situations encountered, U.S. Pat. No. 8,167,319 proposes adding to each connecting rod a hydraulic actuator coupled to a fluid circuit comprising an electrically-operated valve, non-return valves and a fluid compensation reservoir. Each fluid circuit is relatively simple but the presence of two fluid circuits increases the overall size and the price.

Moreover, in the solution described in the above, if the vehicle comprises two axle assemblies, four electrically-operated valves are required. Now, the greater the number of electrically-operated valves, the higher the risk of failure or malfunction and the greater the electricity consumption. Furthermore, the greater the number of electrically-operated valves, the more wiring harnesses must be provided in order to supply these valves with power and commands, and so the production and installation costs increase and the installation in the vehicle and the algorithms to generate the commands for the valves both become more complicated.

SUMMARY

The main object of the invention is therefore to improve the situation described above.

To this end, an anti-roll device designed to equip a motor vehicle axle assembly having right and left wheels is disclosed and which comprises a bar coupled to these right and left wheels via two connecting rods.

This anti-roll device comprises coupling means partially forming part of the bar or of one of the connecting rods and comprises:
  a housing defining a chamber subdivided into first and second parts defining volumes that can be varied by a piston, and comprising first and second inlets-outlets communicating respectively with these first and second parts and an intermediate inlet-outlet communicating with the first part and/or the second part depending on the position of the piston,
  a fluid reservoir placed at one end of a conduit having another end coupled to the intermediate inlet-outlet,
  first and second non-return means each coupled to one of the first and second outlets-inlets and to the conduit, and
  an electrically-operated valve coupled to the first and second inlets-outlets and placed either in an open state ensuring a connection between the first and second parts and the fluid reservoir via the intermediate inlet-outlet, or in a closed state allowing fluid discharge out of the chamber only through the intermediate inlet-outlet, depending on a command received.

Due to the use of a fluid circuit comprising only one electrically-operated valve, two non-return means and one fluid reservoir (for compensation), the complexity, size, electricity consumption and cost of the anti-roll device are reduced, the installation of this device and the command-generating algorithm is simplified and the risk of failure or malfunction is diminished.

The anti-roll device can comprise other characteristics that can be taken separately or in combination, and in particular:
  the piston can comprise a peripheral edge having a thickness strictly less than a dimension corresponding to the intermediate inlet-outlet;
  the peripheral edge of the piston can partially house a seal having a thickness strictly less than the corresponding dimension of the intermediate inlet-outlet;
  in a first embodiment, one of the connecting rods can comprise the housing and piston to define a connecting rod of variable length which is operated (controlled) by the command received, and the other connecting rod can have a fixed length;
  in a second embodiment, the bar can comprise first and second arms each of which comprises a first end coupled to one of the connecting rods and a second end coupled to the housing or to the piston of the coupling means;
  in this embodiment, the housing and piston can define a vane actuator or a screw actuator;
  the device can comprise control means which places the electrically-operated valve in its open or closed state depending on the command received.

The invention also proposes a vehicle, possibly a motor vehicle which comprises at least one axle assembly comprising right and left wheels coupled via an anti-roll device of the type described above.

DESCRIPTION OF THE FIGURES

Further features and advantages of the invention will emerge from the following detailed description and from the accompanying drawings, in which.

DETAILED DESCRIPTION

The principle aim of the invention is to propose an anti-roll (or anti-sway or stabilizer) device DA designed to equip an axle assembly of a motor vehicle.

In what follows, we will consider, by way of non-limiting example, that the motor vehicle is a car. But the invention is not limited to such a motor vehicle. In fact, it relates to any type of motor vehicle comprising at least one axle assembly that must be equipped with an anti-roll device.

Moreover, in what follows, we will consider, by way of non-limiting example, that the axle assembly is designed to be installed in a front part (i.e., front axle assembly) of a motor vehicle. But the invention also relates to the rear axle assembly of a motor vehicle.

Figure 1:
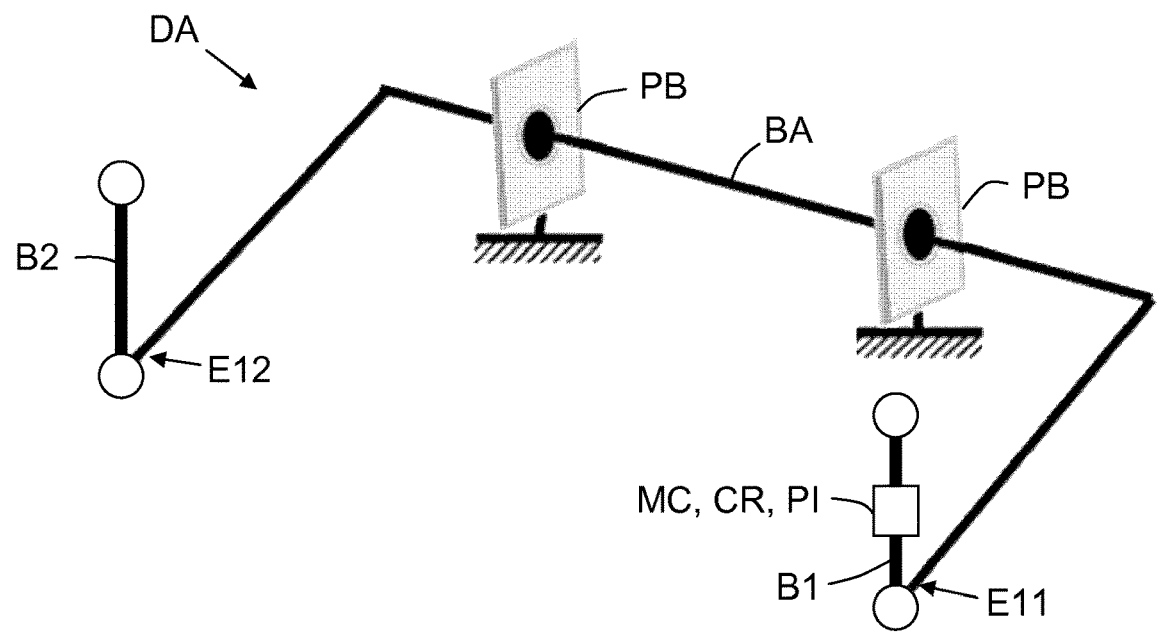
FIG. 1 shows schematically and operationally, in a perspective view, a first embodiment of an anti-roll device, before it is coupled to an axle assembly of a motor vehicle.
Figure 3:
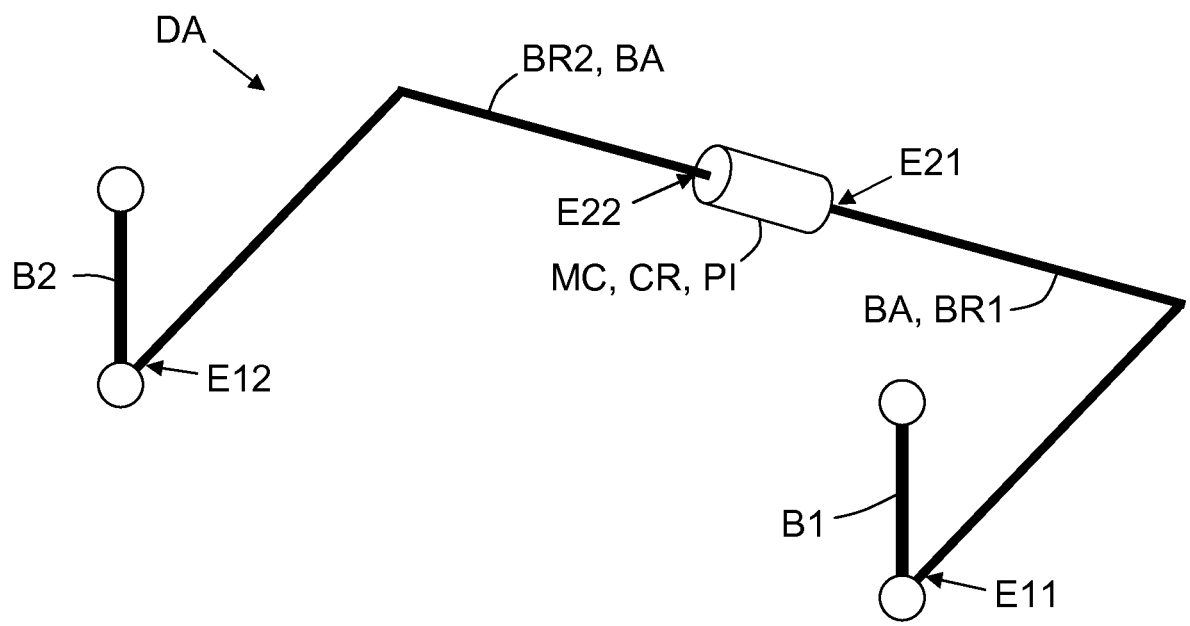
FIG. 3 shows schematically and operationally, in a perspective view, a second embodiment of an anti-roll device, before it is coupled to an axle assembly of a motor vehicle.

FIGS. 1 and 3 show schematically two embodiments of an anti-roll device DA, designed to equip an axle assembly of a motor vehicle (in this case, a car).

As shown, an anti-roll device DA comprises at least one anti-roll bar BA of the first B1 and second B2 connecting rods, as well as coupling means MC.

The (anti-roll) bar BA is coupled to the right and left wheels of an axle assembly of a motor vehicle, via the first B1 and second B2 connecting rods. It is moreover coupled to the vehicle body, for example by bearings PB, as shown by way of non-limiting example in FIG. 1.

In the two non-limiting embodiments shown in FIGS. 1 and 3, the (anti-roll) bar BA has a general U shape. But this is not obligatory.

In the first non-limiting embodiment shown in FIG. 1, the (anti-roll) bar BA is in one piece. It therefore comprises two opposite ends E1$j$ (j=1 or 2) coupled respectively to the right and left wheels of an axle assembly via the first V1 and second B connecting rods. The connecting rod B$j$/first end E1$j$ can be achieved, for example, by a ball-joint or pivoting connection.

By contrast, in the second non-limiting embodiment shown in FIG. 3, the (anti-roll) bar BA comprises first BR1 and second BR2 arms that are independent of one another and each comprise first E1$j$ and second E2$j$ ends. Each first end E1$j$ is coupled to one of the right and left wheels of an axle assembly via one of the connecting rods B$j$. The connecting rod B$j$/first end E1$j$ coupling can be achieved, for example, by a ball-joint or pivoting connection. The second ends E2$j$ are coupled by means of coupling means MC.

It will be noted that in the two non-limiting embodiments shown in FIGS. 1 and 3, the value 1 of the index j designates the right-hand side while the value 2 of the index j designates the left-hand side. But the reverse is possible.

The coupling means MC partially forms part either of the bar BA, as shown in FIG. 3, or of one of the connecting rods B$j$, as shown in FIG. 1.

Figure 2:
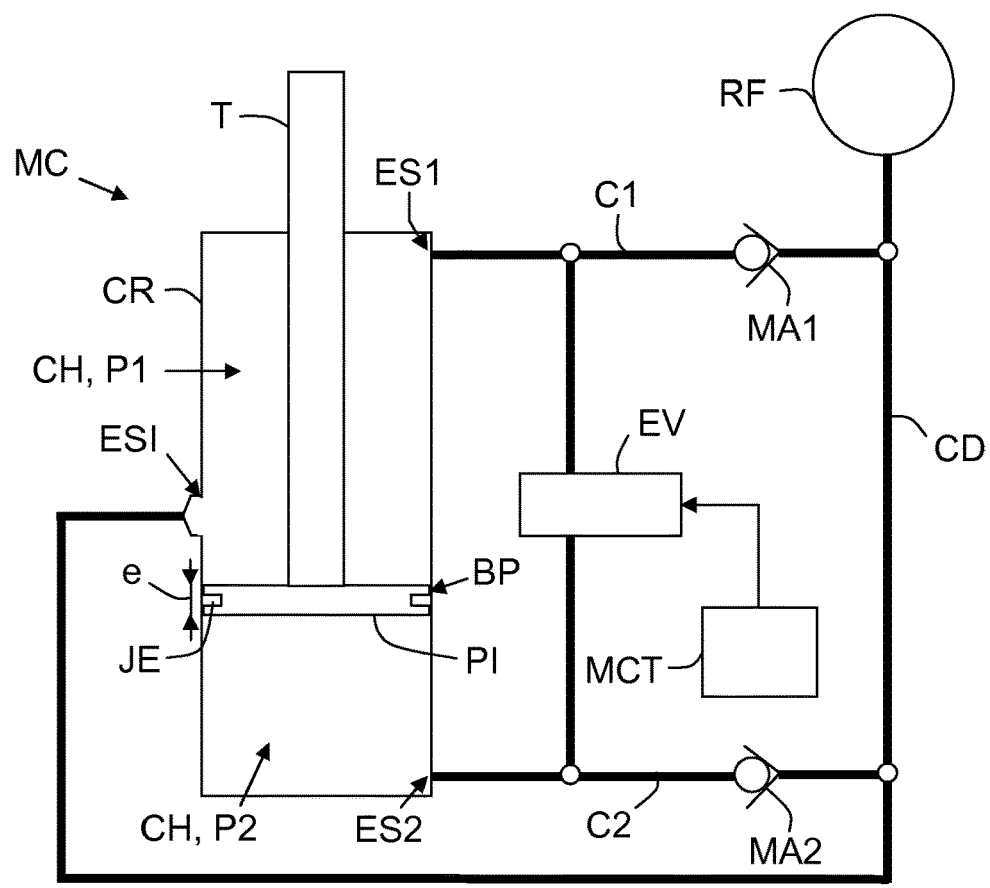
FIG. 2 shows schematically and operationally, in a cross-sectional view, an embodiment of coupling means of an anti-roll device.

This coupling means MC comprises a housing CR, a piston P1, a fluid reservoir RF, first MA1 and second MA2 non-return means and an electrically-operated valve EV, as shown in the non-limiting embodiment in FIG. 2.

The housing CR defines a chamber CH that is subdivided into first P1 and second P2 parts defining volumes that can be varied by a piston P1 fixedly attached to a rod T. Moreover, the housing CR comprises a first inlet-outlet ES1 that communicates with the first part P1 of the chamber CH, a second inlet-outlet ES2 that communicates with the second part P2 of the chamber CH and an intermediate inlet-outlet ESI that communicates with the first part P1 and/or the second part P2 of the chamber CH depending on the position of the piston P1.

The housing CR and the piston P1 (with its rod T) define a sort of actuator with three inlets-outlets ES1, ES2 and ESI.

In the first non-limiting example shown in FIG. 1, the housing CR is fixedly attached to a lower part of the first connecting rod B1, and the end of the rod T that is opposite the piston P1 is fixedly attached to an upper part of the first connecting rod B1. By contrast, in the second non-limiting embodiment shown in FIG. 3, the housing CR is fixedly attached to the second end E21 of the first arm BR1, and the end of the rod T that is opposite the piston P1 is fixedly attached to the second end E22 of the second arm BR2. A reverse arrangement is also possible.

It will be noted that the housing CR can have, for example, a circular cylindrical shape.

It will also be noted that in the first non-limiting embodiment shown in FIG. 1, the housing CR and the piston P1 can define a conventional actuator due to the fact that they enable a variation, by translation of the piston P1 with its rod T, of the length (or height) of the (first) connecting rod B1 when the connecting rod B1 reacts to the stresses of the axle assembly. In other words, one of the connecting rods B$j$ (in this case, B1) constitutes a connecting rod of variable length, controlled by a command, and the other connecting rod B$j$' (in this case, B2) has a fixed length and is therefore completely conventional.

By contrast, in the second non-limiting example shown in FIG. 3, the housing CR and the piston P1 can define a vane actuator or a screw actuator, for example, due to the fact that they enable a variation, by a combination of a rotation and a translation of the piston P1 with its rod T, of the relative rotation of the first arm BR1 in relation to the second arm BR2. In other words, one of the two parts P$j$ (for example P1) constitutes a "stator chamber" whereas the other part (for example P2) constitutes a "rotor chamber." The two connecting rods B$j$ thus have, in this case, a fixed length. The connecting rods B$j$ are thus conventional and have no coupling means MC.

The fluid reservoir RF is located at one end of a conduit CD, which has another end coupled to the intermediate inlet-outlet ESI of the housing CR (and so to the chamber CH). It is designed to act as a fluid compensator. In fact, the fluid reservoir compensates for variations in volume related to the movement of the rod T as well as variations related to temperature. The fluid can, for example, be an oil. This could therefore be, for example, a hydraulic oil or a shock-absorbing oil.

It will be noted that the fluid reservoir RF can be separated from the chamber CH by a floating piston. It must be possible to isolate the fluid reservoir from the first P1 and second P2 parts of the chamber CH for proper operation in locked mode.

The first MA1 and second MA2 non-return means are each coupled to one of the first ES1 and second ES2 inlets-outlets and to the conduit CD. The first non-return means MA1 form part of a first conduit C1 that communicates with the first inlet-outlet ES1 and the conduit CD. The second non-return means MA2 form part of a second conduit C2 that communicates with the second inlet-outlet ES2 and the conduit CD.

For example, these first MA1 and second MA2 non-return means can be one-way valves. But this is not obligatory. In fact, what is important is that they each enable a circulation of fluid in one direction only (in this case, from the fluid reservoir RF towards the inlet-outlet ES1 or ES2), but not in the opposite direction (namely, in this case, from an inlet-outlet ES1 or ES2 towards the fluid reservoir RF).

The electrically-operated valve EV is coupled to the first ES1 and second ES2 inlets-outlets and is placed either in an open state or a closed state depending on a command received. The coupling means MC is therefore controlled by the command that its electrically-operated valve EV receives.

The electrically-operated valve communicates, for example, with the respective intermediate parts of the first C1 and second C2 conduits, located between the housing CR and the first MA1 and second MA2 non-return means.

It will be noted that in a variation not shown, the electrically-operated valve EV could form part of the piston P1. Such a variation is well known to a person skilled in the art.

In the open state, the electrically-operated valve EV ensures a fluid connection between the first P1 and second P2 parts and the fluid reservoir RF via the intermediate inlet-outlet ESI.

The first P1 and second P2 parts of the chamber CH being connected together and one of them always being connected to the fluid (or compensation) reservoir RF via the intermediate inlet-outlet ESI and the conduit CD, these first P1 and second P2 parts are thus connected to the compensation reservoir. Consequently, in the case of the first embodiment shown in FIG. 1, the length (or height) of the first connecting rod B1 can vary freely.

In the closed state, the electrically-operated valve EV allows fluid discharge out of the chamber CH only through the intermediate inlet-outlet ESI.

In fact, the first MA1 and second MA2 non-return means prevent the circulation of fluid from both the first ES1 and second ES2 inlets-outlets towards the fluid reservoir RF, and so fluid discharge out of the chamber CH is possible only through the intermediate inlet-outlet ESI. Consequently, in the case of the first embodiment shown in FIG. 1, the length (or height) of the first connecting rod B1 cannot vary freely. This operation is similar to that of a hydraulic ratchet and enables an equilibrium position to be achieved at mid-travel when the piston P1 is level with the intermediate inlet-outlet ESI.

It will be noted that the fluid reservoir RF and/or the first MA1 and second MA2 non-return means and/or the electrically-operated valve EV and/or the conduit CD and/or the first C1 and second C2 conduits can be outside the housing CR defining the chamber CH, as shown in FIG. 2, or they may be contained in another housing in which the housing CR defining the chamber CH is also contained.

It is also important to note that the fluid must be able to enter and exit the chamber CH regardless of the position of the piston P1 in the chamber. To achieve this, the piston P1, as shown by way of non-limiting example in FIG. 2, can comprise a peripheral edge BP having a thickness e strictly less than a corresponding dimension of the intermediate inlet-outlet ESI. As a variation, the intermediate inlet-outlet ESI can comprise two sub-parts that are separated by a distance greater than the thickness e of the piston P1.

Furthermore, it is preferable that the peripheral edge BP of the piston P1 partially houses a seal JE having a thickness strictly less than the corresponding dimension of the intermediate inlet-outlet ESI. This prevents the seal JE from completely obstructing the intermediate inlet-outlet ESI when the piston P1 is at mid-travel.

It will be noted that the hydraulic connection at mid-travel (that is to say at the level of the intermediate inlet-outlet ESI) is of a size as to prevent the extrusion of the seal JE from the piston P1.

The command received that enables the electrically-operated valve EV to be placed in its open (or passing) state or in its closed (or non-passing) state comes from control means MCT. This command can, for example, be determined depending on irregularities detected beneath the vehicle by a physical parameter sensor (such as an accelerometer) and/or an end of turn detected in front of the vehicle by observation means or by a satellite navigation system and/or the current speed of the vehicle. These control means MCT may form part of the anti-roll device DA. For example, they can form part of a vehicle's computer and be responsible for determining each command in real time and dynamically.

It will be noted that when the motor vehicle comprises two axle assemblies, each of them can be equipped with an anti-roll device DA according to the invention.

The invention offers several advantages, including:
- a reduction in complexity, size, electricity consumption and the cost of the anti-roll device due to the fact of using only one electrically-operated valve per wheel assembly,
- a simplification of the installation of the anti-roll device and of the algorithm for generating the command due to the fact of using only one electrically-operated valve per wheel assembly and thus only one supply and control wiring harness,
- a reduction in the risk of failure or malfunction due to the fact of using only one electrically-operated valve per wheel assembly.

The invention claimed is:

1. An anti-roll device for a motor vehicle axle assembly, said device comprising a bar coupled to right and left wheels of said assembly via two connecting rods, the device comprising coupling means partially forming part of said bar, said coupling means comprising:
   i) a housing defining a chamber subdivided into first and second parts defining volumes that can be varied by a piston, and comprising first and second inlets-outlets communicating respectively with said first and second parts and an intermediate inlet-outlet communicating with said first part and/or said second part depending on the position of said piston,
   ii) a fluid reservoir placed at one end of a conduit having another end coupled to said intermediate inlet-outlet,
   iii) first and second non-return means each coupled to one of said first and second outlets-inlets and to said conduit, and
   iv) an electrically-operated valve coupled to said first and second inlets-outlets and placed either in an open state ensuring a connection between the first and second parts of said chamber and said fluid reservoir via said intermediate inlet-outlet, or in a closed state allowing fluid discharge out of said chamber only through the intermediate inlet-outlet, depending on a command received.

2. The device according to claim 1, wherein said piston comprises a peripheral edge having a thickness strictly less than a dimension of said intermediate inlet-outlet.

3. The device according to claim 2, wherein said peripheral edge of the piston partially houses a seal having a thickness strictly less than said corresponding dimension of the intermediate inlet-outlet.

4. The device according to claim 1, wherein said bar comprises first and second arms each comprising a first end coupled to one of said connecting rods and a second end coupled to said housing or to said piston of the coupling means.

5. The device according to claim 4, wherein said housing and piston define a vane actuator or a screw actuator.

6. The device according to claim 1, wherein said device comprises control means adapted for generating said command bound for said electrically-operated valve.

7. A vehicle comprising at least one axle assembly comprising right and left wheels, said vehicle also comprising at least one anti-roll device according to claim 1, and said anti-roll device being coupled to said right and left wheels of the axle assembly.

8. The vehicle according to claim 7, wherein said vehicle is an automobile.

* * * * *